(12) United States Patent
Inaba

(10) Patent No.: US 8,332,771 B2
(45) Date of Patent: Dec. 11, 2012

(54) TRANSMISSION DEVICE AND METHOD, RECEPTION DEVICE AND METHOD, AND TRANSMISSION/RECEPTION SYSTEM

(75) Inventor: Takuya Inaba, Kanagawa (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 12/707,862

(22) Filed: Feb. 18, 2010

(65) Prior Publication Data

US 2010/0281363 A1 Nov. 4, 2010

(30) Foreign Application Priority Data

Apr. 30, 2009 (JP) ................................. 2009-110294

(51) Int. Cl.
*G06F 3/048* (2006.01)
(52) U.S. Cl. ........................................ 715/769; 715/702
(58) Field of Classification Search .................. 715/769, 715/702
See application file for complete search history.

(56) References Cited

U.S. PATENT DOCUMENTS

| | | | | |
|---|---|---|---|---|
| 6,191,807 B1* | 2/2001 | Hamada et al. | ............ | 348/14.07 |
| 6,372,974 B1* | 4/2002 | Gross et al. | ...................... | 84/609 |
| 7,159,186 B2* | 1/2007 | Mattila et al. | .................. | 715/769 |
| 2002/0080179 A1* | 6/2002 | Okabe et al. | .................. | 345/769 |
| 2003/0222913 A1* | 12/2003 | Mattila et al. | .................. | 345/764 |
| 2004/0032394 A1* | 2/2004 | Ayatsuka et al. | ............. | 345/156 |
| 2006/0146765 A1* | 7/2006 | Van De Sluis et al. | ........ | 370/338 |
| 2008/0222688 A1* | 9/2008 | Han | ................................ | 725/106 |
| 2008/0229211 A1* | 9/2008 | Herberger et al. | ............. | 715/744 |
| 2008/0256471 A1* | 10/2008 | Okamoto | ....................... | 715/769 |
| 2009/0247080 A1* | 10/2009 | Falck | ............................ | 455/41.2 |
| 2010/0169814 A1* | 7/2010 | Zhang | ............................ | 715/769 |
| 2010/0275135 A1* | 10/2010 | Dunton et al. | ................. | 715/753 |

FOREIGN PATENT DOCUMENTS

| | | |
|---|---|---|
| JP | 2004-54879 | 2/2004 |
| JP | 2006-518507 | 8/2006 |
| JP | 2008-257442 | 10/2008 |

* cited by examiner

*Primary Examiner* — William Bashore
*Assistant Examiner* — Henry Orr
(74) *Attorney, Agent, or Firm* — Oblon, Spivak, McClelland, Maier & Neustadt, L.L.P.

(57) ABSTRACT

A transmission device for transmitting data to a reception device as a data destination, includes: a display control means for controlling display of an icon corresponding to the data directed to a first display section as a touch panel; an operation detection means for detecting an operation of a first user on the first display section on which the icon is displayed; a destination operation sensing means for sensing an operation of a second user on a second display section as a touch panel on which part of the icon is displayed in the reception device when the icon is held in a predetermined region of the first display section; and a transmission control means for controlling the start of transmission of the data to the reception device when the operation detection means detects that the icon is opened in the predetermined region of the first display section from a state in which the icon is held in the predetermined region of the first display section and the part of the icon is held in the second display section.

11 Claims, 9 Drawing Sheets

TRANSMISSION DEVICE AND METHOD, RECEPTION DEVICE AND METHOD, AND TRANSMISSION/RECEPTION SYSTEM

BACKGROUND OF THE INVENTION

1. Field of the Invention

The present invention relates to a transmission device and method, a reception device and method, and a transmission/reception system, and more particularly to a transmission device and method, a reception device and method, and a transmission/reception system that can exchange data by a more simple and intuitive operation.

2. Description of the Related Art

In the past, various technologies for a data transmission method have been proposed.

For example, there is a technique in which a user transmits data to a portable terminal possessed by the user by dragging and dropping a data icon to a transmission region arranged in an outer edge portion on a screen of an electronic notice device (see JP-A-2008-257442).

A display device has been proposed in which data is transmitted by recognizing a memory card or a portable terminal connected to a personal computer via a connection interface as a storage device, displaying an icon or window of the storage device at a screen position corresponding to a position of the connection interface, and dragging and dropping a data icon to the icon or window thereof (see JP-A-2004-54879).

Furthermore, a method has been proposed in which data is transmitted between portable terminals by arranging a shared space on display screens of a plurality of portable terminals and dragging and dropping a data icon to the shared space (see JP-T-2006-518507).

SUMMARY OF THE INVENTION

However, the method of JP-A-2008-257442 constantly uses the outer edge portion of the screen for a connection to the outside. Thus, when it is applied to a portable terminal or the like having a small screen, operability worsens since the display region is narrow.

In JP-A-2004-54879, there is a generally used an operation of dragging and dropping the data icon to the icon or window of the storage device as an operation for a computer. However, since the drag and drop operation is different from an operation in which a user transfers an object to another user in the real world, the drag and drop operation is not easy for users unfamiliar with the operation of a computer.

Even in the method of JP-T-2006-518507, it is necessary to provide a shared space on the display screen. When the method is applied to a portable terminal having a small screen, operability worsens since the display region is narrow. Since the drag and drop operation is different from an operation in which a user transfers an object to another user in the real world, the drag and drop operation is not easy for users unfamiliar with the operation of a computer.

It is desirable to exchange data by a more simple and intuitive operation.

According to a first embodiment of the present invention, there is provided a transmission device for transmitting data to a reception device as a data destination, including: a display control means for controlling display of an icon corresponding to the data directed to a first display section as a touch panel; an operation detection means for detecting an operation of a first user on the first display section on which the icon is displayed; a destination operation sensing means for sensing an operation of a second user on a second display section as a touch panel on which part of the icon is displayed in the reception device when the icon is held in a predetermined region of the first display section; and a transmission control means for controlling the start of transmission of the data to the reception device when the operation detection means detects that the icon is opened in the predetermined region of the first display section from a state in which the icon is held in the predetermined region of the first display section and the part of the icon is held in the second display section.

When the operation detection means detects that the icon is opened in an outer edge portion of the first display section from a state in which the icon is held in the outer edge portion of the first display section and the part of the icon is held in the second display section and the destination operation sensing means senses that the entire icon is held to be displayed on the second display section, the display control means may end the icon display, and the transmission control means may control the transmission of the data to the reception device.

The display control means may cause the first display section to display the entire icon when the operation detection means detects that the icon is opened in the first display section from a state in which the icon is held in the outer edge portion of the first display section and the part of the icon is displayed on the second display section.

According to the first embodiment of the present invention, there is provided a transmission method for use in a transmission device for transmitting data to a reception device as a data destination, including the steps of: controlling display of an icon corresponding to the data directed to a first display section as a touch panel; detecting an operation of a first user on the first display section on which the icon is displayed; sensing an operation of a second user on a second display section as a touch panel on which part of the icon is displayed in the reception device when the icon is held in a predetermined region of the first display section; and controlling the start of transmission of the data to the reception device when a process of the operation detection step detects that the icon is opened in the predetermined region of the first display section from a state in which the icon is held in the predetermined region of the first display section and the part of the icon is held in the second display section.

According to a second embodiment of the present invention, there is provided a reception device for receiving data transmitted from a transmission device as a data source, including: a source operation sensing means for sensing an operation of a first user on a first display section as a touch panel on which an icon corresponding to the data is displayed in the transmission device; a display control means for controlling display of part of the icon directed to a second display section as a touch panel when the source operation sensing means senses that the icon is held in a predetermined region of the first display section; an operation detection means for detecting an operation of a second user on the second display section on which the part of the icon is displayed; and a reception control means for controlling the start of reception of the data transmitted from the transmission device when the source operation sensing means senses that the icon is opened in a predetermined region of the first display section from a state in which the icon is held in the predetermined region of the first display section and the part of the icon is held in the second display section.

The reception control means may control the start of reception of the data transmitted from the transmission device when the source operation sensing means senses that the icon is opened in an outer edge portion of the first display section from a state in which the icon is held in the outer edge portion of the first display section and the part of the icon is held in the second display section, and the operation detection means detects that the entire icon is held to be displayed on the second display section.

The display control means may end the icon display when the source operation sensing means senses that the icon is opened in the outer edge portion of the first display section from the state in which the icon is held in the outer edge portion of the first display section and the part of the icon is displayed on the second display section.

According to the second embodiment of the present invention, there is provided a reception method for use in a reception device for receiving data transmitted from a transmission device as a data source, including the steps of: sensing an operation of a first user on a first display section as a touch panel on which an icon corresponding to the data is displayed in the transmission device; controlling display of part of the icon directed to a second display section as a touch panel when a process of the source operation sensing step senses that the icon is held in a predetermined region of the first display section; detecting an operation of a second user on the second display section on which the part of the icon is displayed; and controlling the start of reception of the data transmitted from the transmission device when a process of the source operation sensing step senses that the icon is opened in a predetermined region of the first display section from a state in which the icon is held in the predetermined region of the first display section and the part of the icon is held in the second display section.

According to a third embodiment of the present invention, there is provided a transmission/reception system having a transmission device configured to transmit data and a reception device configured to receive the data transmitted from the transmission device, including: the transmission device having a first display control means for controlling display of an icon corresponding to the data directed to a first display section as a touch panel; a first operation detection means for detecting an operation of a first user on the first display section on which the icon is displayed; a destination operation sensing means for sensing an operation of a second user on a second display section as a touch panel on which part of the icon is displayed in the reception device when the icon is held in a predetermined region of the first display section; and a transmission control means for controlling the start of transmission of the data to the reception device when the first operation detection means detects that the icon is opened in the predetermined region from a state in which the icon is held in the predetermined region and the part of the icon is held in the second display section; and the reception device having a source operation sensing means for sensing the operation of the first user on the first display section in the transmission device; a second display control means for controlling display of the part of the icon on the second display when the source operation sensing means senses that the icon is held in a predetermined region of the first display section; a second operation detection means for detecting an operation of a second user on the second display section on which the part of the icon is displayed; and a reception control means for controlling the start of reception of the data transmitted from the transmission device when the source operation sensing means senses that the icon is opened in the predetermined region of the first display section from the state in which the icon is held in the predetermined region of the first display section and the part of the icon is held in the second display section.

In the first embodiment of the present invention, display of an icon corresponding to data directed to a first display section as a touch panel is controlled. An operation of a first user on the first display section on which the icon is displayed is detected. An operation of a second user on a second display section as a touch panel on which part of the icon is displayed in a reception device is sensed when the icon is held in a predetermined region of the first display section. Control is performed to start transmission of the data to the reception device when it is detected that the icon is opened in the predetermined region of the first display section from a state in which the icon is held in the predetermined region of the first display section and the part of the icon is held in the second display section.

In the second embodiment of the present invention, an operation of a first user on a first display section as a touch panel on which an icon corresponding to data is displayed is sensed in a transmission device. Display of part of the icon directed to a second display section as a touch panel is controlled when it is sensed that the icon is held in a predetermined region of the first display section. An operation of a second user on the second display section on which the part of the icon is displayed is detected. Control is performed to start reception of the data transmitted from the transmission device when it is sensed that the icon is opened in a predetermined region of the first display section from a state in which the icon is held in the predetermined region of the first display section and the part of the icon is held in the second display section.

In the third embodiment of the present invention, display of an icon corresponding to data directed to a first display section as a touch panel is controlled. An operation of a first user on the first display section on which the icon is displayed is detected. An operation of a second user on a second display section as a touch panel on which part of the icon is displayed in a reception device is sensed when the icon is held in a predetermined region of the first display section. Control is performed to start transmission of the data to the reception device when it is detected that the icon is opened in the predetermined region from a state in which the icon is held in the predetermined region and the part of the icon is held in the second display section. The operation of the first user on the first display section in the transmission device is sensed. Display of the part of the icon on the second display is controlled when it is sensed that the icon is held in a predetermined region of the first display section. An operation of a second user on the second display section on which the part of the icon is displayed is detected. Control is performed to start reception of the data transmitted from the transmission device when it is sensed that the icon is opened in the predetermined region of the first display section from the state in which the icon is held in the predetermined region of the first display section and the part of the icon is held in the second display section.

According to the first to third embodiments of the present invention, it is possible to exchange data by a more simple and intuitive operation.

DETAILED DESCRIPTION OF THE INVENTION

Hereinafter, embodiments of the present invention will be described with reference to the drawings.

[Configuration Example of Transmission/Reception System]

Figure 1:
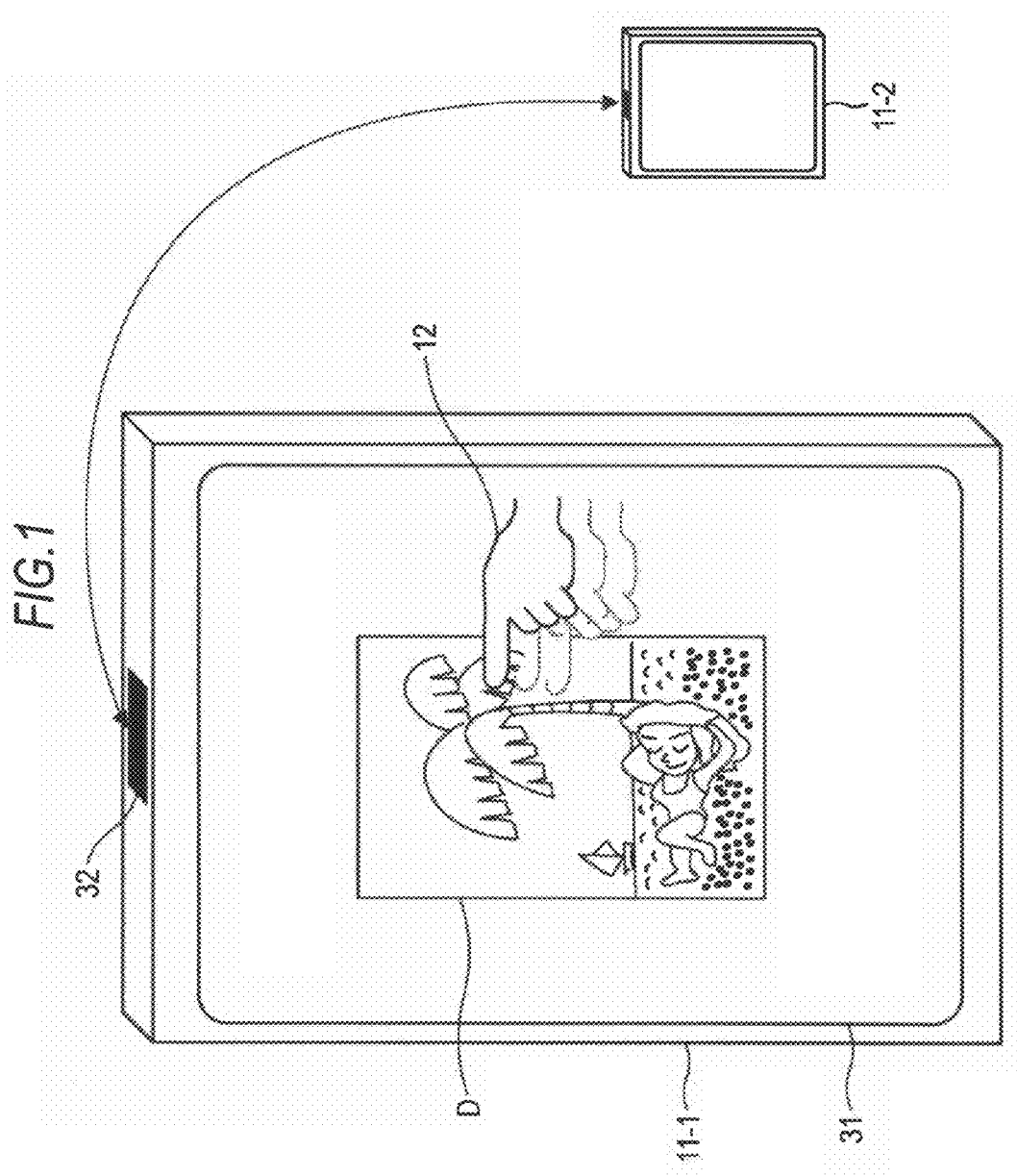
FIG. 1 is a block diagram showing a configuration example of a transmission/reception system according to an embodiment of the present invention.

FIG. 1 is a block diagram showing a configuration example of a transmission/reception system according to an embodiment of the present invention. The transmission/reception system of FIG. 1 includes portable terminal devices 11-1 and 11-2. For example, the portable terminal devices 11-1 and 11-2 are constituted as a portable phone or a PDA (Personal Digital Assistant), and transmit/receive data therebetween by establishing a wired or wireless connection to each other so that communication is possible. Hereinafter, in the case where it is not necessary to distinguish the portable terminal devices 11-1 and 11-2, they are simply referred to as the portable terminal devices 11.

As shown in FIG. 1, the portable terminal device 11 (11-1) is operated by a user 12 and is provided with a display section 31 and a communication section 32. In the portable terminal device 11, the display section 31 as a touch panel is pressed and operated by a finger of the user 12 or a stylus pen or the like handled by the user 12, so that a data icon D displayed on the display section 31 is freely moved on the display section 31. Here, the data icon D (hereinafter, simply referred to as the icon D) is an icon representing various data such as image (still image and moving image) data, audio data, text data, and a program for executing various processes of the portable terminal device 11 recorded to the portable terminal device 11. In the portable terminal device 11 (11-1), the user 12 transmits data corresponding to the icon D to a communication party (the portable terminal device 11-2) via the communication section 32 by performing a predetermined operation on the icon D displayed on the display section 31.

[Functional Configuration Example of Portable Terminal Device]

Next, a functional configuration example of the portable terminal device 11 will be described with reference to FIG. 2.

Figure 2:
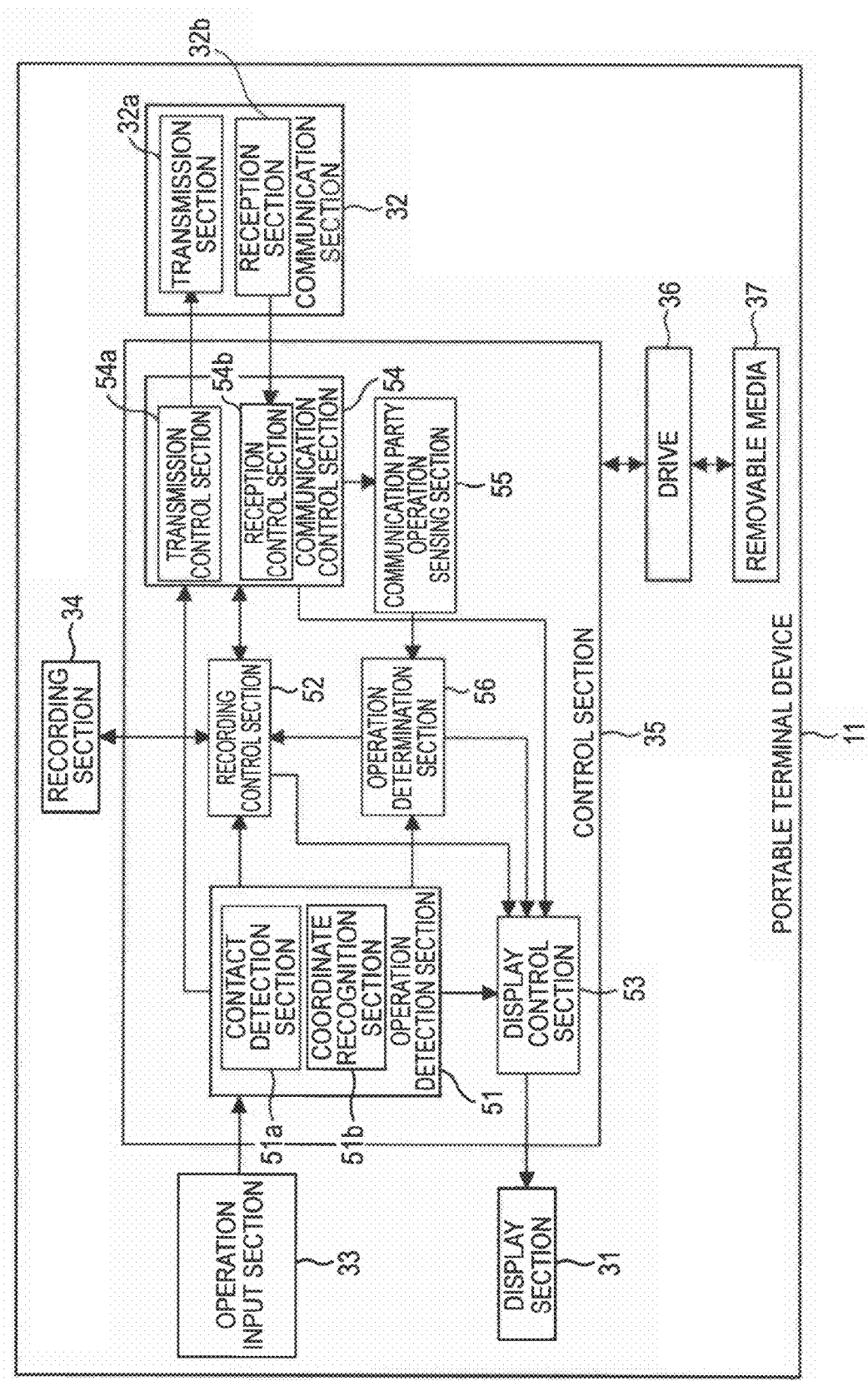
FIG. 2 is a block diagram showing a functional configuration example of a portable terminal device.

The portable terminal device 11 of FIG. 2 includes a display section 31, a communication section 32, an operation input section 33, a recording section 34, and a control section 35.

The display section 31 is the same as described with reference to FIG. 1. The display section 31 includes a display device such as an LCD (Liquid Crystal Display) or organic EL (Electro Luminescence) to display various images on the basis of control of the control section 35. More specifically, for example, the display section 31 displays an icon D representing predetermined data on the basis of control of the control section 35 in response to an operation of the user 12 on the operation input section 33.

The communication section 32 is the same as described with reference to FIG. 1. The communication section 32 transmits/receives data to/from the portable terminal device 11 as a communication party via a wired or wireless network. More specifically, the communication section 32 performs short-range wireless communication by infrared, Bluetooth (registered trademark), or TransferJet (registered trademark), wired communication via a USB (Universal Serial Bus) cable, or long-range wireless communication by WiMAX (Worldwide Interoperability for Microwave Access) or LTE (Long Term Evolution), or IEEE (The Institute of Electrical and Electronic Engineers) 802.11a or 802.11b used for the so-called Wi-Fi. The communication section 32 has a transmission section 32a and a reception section 32b. On the basis of control of the control section 35, the transmission section 32a transmits data and the reception section 32b receives data.

The operation input section 33 is a touch panel integrated with the display section 31, and allows the user 12 to perform an operation to input an instruction to the portable terminal device 11. The operation input section 33 receives an operation from the finger, stylus pen or the like by the user 12, and supplies a signal (information) indicating the operation content to the control section 35. The operation input section 33 may be constituted to include various operation buttons, a keyboard, a mouse, a remote control, and a microphone as well as the touch panel arranged on top of the display section 31.

The recording section 34 includes a hard disk drive, an optical disk such as a DVD (Digital Versatile Disk) to be driven by a predetermined drive and its drive, a semiconductor memory such a memory card, or the like. For example, the recording section 34 records various data to be transmitted/received to/from the communication section 32.

For example, the control section 35 includes a microprocessor or the like and controls the entirety of the portable terminal device 11. The control section 35 includes an operation detection section 51, a recording control section 52, a display control section 53, a communication control section 54, a communication party operation sensing section 55, and an operation determination section 56.

The operation detection section 51 detects an operation on the operation input section 33 of the user 12. More specifically, the operation detection section 51 supplies each block of the control section 35 with information corresponding to the operation of the user 12 on the basis of the information representing the operation of the user 12 from the operation input section 33. The operation detection section 51 includes a contact detection section 51a and a coordinate recognition section 51b. The contact detection section 51a detects a state in which the finger, stylus pen or the like of the user 12 is in contact with the operation input section 33 as the touch panel by an operation of the user 12. For example, the coordinate recognition section 51b recognizes a coordinate position at which the contact of the finger or stylus pen of the user 12 has been detected on the operation input section 33 by the contact detection section 51a.

The recording control section 52 controls a process of recording data to and reading data from the recording section 34 on the basis of information corresponding to the operation of the user 12 from the operation detection section 51 or information from the operation determination section 56. For example, the recording control section 52 reads data from the recording section 34 on the basis of the information corresponding to the operation of the user 12 from the operation detection section 51 and supplies the read data to the display control section 53 or the communication control section 54.

For example, the recording control section 52 reads data from the recording section 34 on the basis of the information from the operation determination section 56 and supplies the read data to the communication control section 54. Alternatively, the recording control section 52 supplies data from the communication control section 54 to the recording section 34 and causes the recording section 34 to record the data.

The display control section 53 controls the display of the display section 31 on the basis of the information corresponding to the operation of the user 12 from the operation detection section 51 or the information from the communication control section 54 or the operation determination section 56. For example, the display control section 53 causes the display section 31 to display an image, text, or the like corresponding to the operation of the user 12 on the basis of the information corresponding to the operation of the user 12 from the operation detection section 51.

The communication control section 54 controls data transmission/reception by the communication section 32. The communication control section 54 has a transmission control section 54a and a reception control section 54b. The transmission control section 54a controls data transmission by the transmission section 32a of the communication section and the reception control section 54b controls data reception by the reception section 32b of the communication section 32.

The communication party operation sensing section 55 senses an operation of another user 12 on the display section 31 of another portable terminal device 11 on the basis of information transmitted from a communication party (the other portable terminal device 11) via the communication section 32 and the communication control section 54. The communication party operation sensing section 55 supplies the operation determination section 56 with information corresponding to the sensed operation of the other user 12.

The operation determination section 56 supplies the recording control section 52 with information for instructing the recording section 34 to record or read data on the basis of the information corresponding to the operation of the user 12 from the operation detection section 51 and the information corresponding to the operation of the other (communication party) user 12 from the communication party operation sensing section 55. The operation determination section 56 supplies the display control section 53 with information for instructing the display section 31 to execute a display operation on the basis of the information corresponding to the operation of the user 12 and the information corresponding to the operation of the other (communication party) user 12.

Removable media 37 such as a magnetic disc, an optical disc, a magneto-optical disc, or a semiconductor memory are appropriately mounted on a drive 36. The drive 36 is controlled by the control section 35 and installs or stores a computer program or data read from the mounted removable media 37 in the recording section 34 if desired.

[Data Transmission Process and Data Reception Process in Transmission/Reception System]

Figure 3:
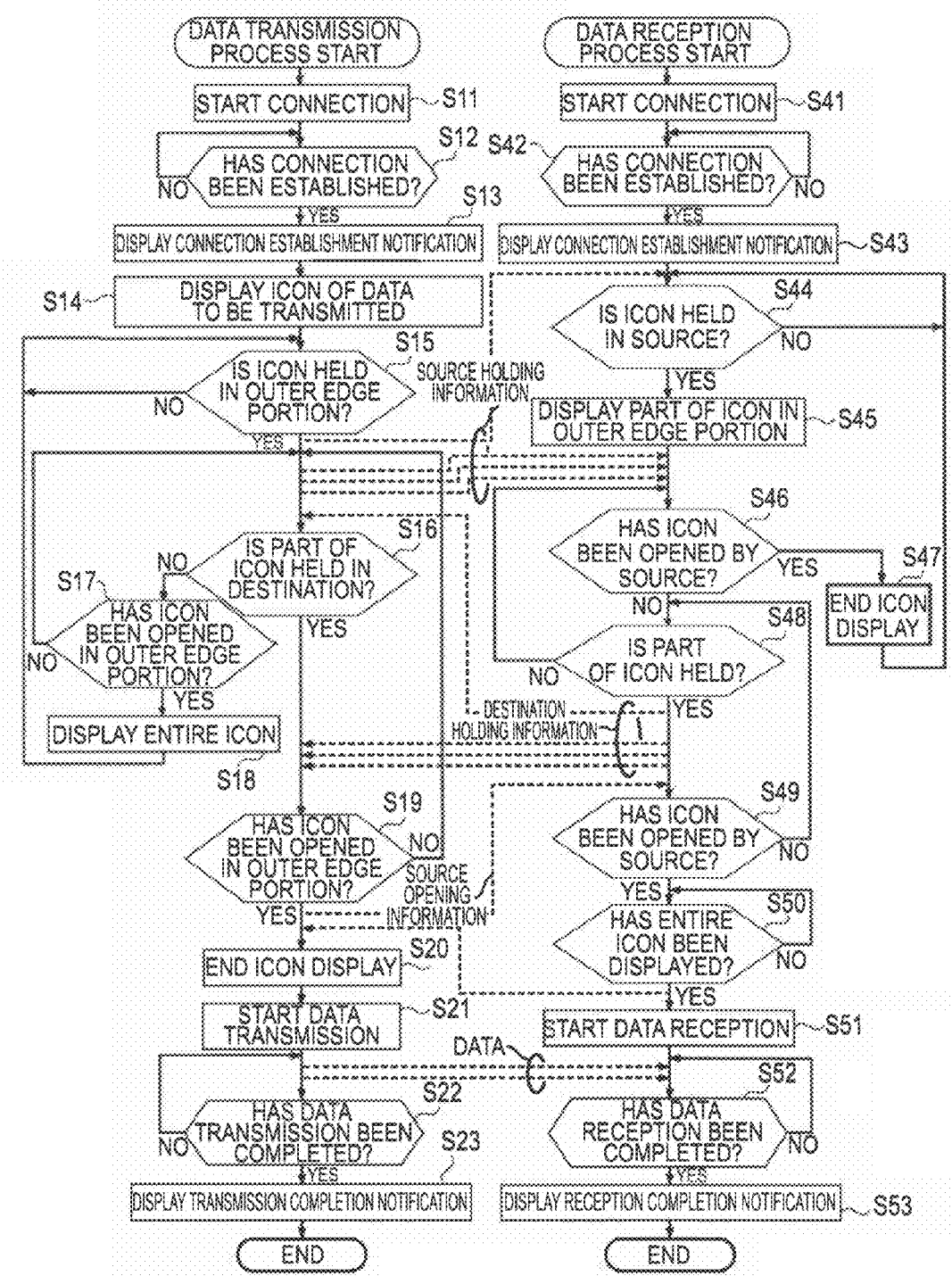
FIG. 3 is a flowchart illustrating a data transmission process and a data reception process.

Next, a data transmission process and a data reception process in the transmission/reception system of FIG. 1 will be described with reference to the flowchart of FIG. 3. In the flowchart of FIG. 3, the portable terminal device 11-1 transmits data to the portable terminal device 11-2 by short-range wireless communication, and the portable terminal device 11-2 receives the data from the portable terminal device 11-1. Hereinafter, for example, a name of each block constituting the portable terminal device 11-1 is represented by attaching "-1" as in a communication section 32-1 or the like, and a name of each block constituting the portable terminal device 11-2 is represented by attaching "-2" as in a communication section 32-2 or the like. Likewise, the user 12 of the portable terminal device 11-1 is referred to as the user 12-1, and the user 12 of the portable terminal device 11-2 is referred to as the user 12-2.

In step S11, the communication control section 54-1 of the portable terminal device 11-1 as a data source causes the communication section 32-1 to start a connection to the portable terminal device 11-2 as a data destination. More specifically, the communication control section 54-1 causes the communication section 32-1 to transmit a start request of the connection to the portable terminal device 11-2 on the basis of information corresponding to an operation indicating an instruction of the connection start by the user 12-1 on the operation input section 33-1 from the operation detection section 51-1.

In step S12, the communication control section 54-1 of the portable terminal device 11-1 determines whether or not the connection to the portable terminal device 11-2 has been established. When it is determined that the connection to the portable terminal device 11-2 is not established, the process of step S12 is repeated until the connection to the portable terminal device 11-2 is established.

When it is determined that the connection to the portable terminal device 11-2 has been established in step S12, the communication control section 54-1 supplies the display control section 53-1 with information indicating that the connection to the portable terminal device 11-2 has been established, and the process proceeds to step S13.

Instep S13, the display control section 53-1 causes the display section 31-1 to display a notification (for example, comment or the like) indicating that the connection to the portable terminal device 11-2 has been established on the basis of the information from the communication control section 54-1. At this time, the display control section 53-1 may change the display of the display section 31-1 by, for example, making the display of a total or part (particularly, a region of the vicinity of the communication section 32-1) of the display section 31-1 bright or flickering the background like shimmering. Furthermore, the display control section 53-1 may light up an indicator (not shown) constituted by an LED (Light Emitting Diode) or the like.

On the other hand, a process corresponding to steps S11 to S13 is also executed in the portable terminal device 11-2.

That is, in step S41, the communication control section 54-2 of the portable terminal device 11-2 as the data destination causes the communication section 32-2 to start a connection to the portable terminal device 11-1 as the data source. More specifically, the communication control section 54-2 causes the communication section 32-2 to start the connection to the portable terminal device 11-1 on the basis of the connection start request from the portable terminal device 11-1.

In step S42, the communication control section 54-2 of the portable terminal device 11-2 determines whether or not the connection to the portable terminal device 11-1 has been established. When it is determined that the connection to the portable terminal device 11-1 is not established, the process of step S42 is repeated until the connection to the portable terminal device 11-1 is established.

When it is determined that the connection to the portable terminal device 11-1 has been established in step S42, the communication control section 54-2 supplies the display control section 53-2 with information indicating that the connection to the portable terminal device 11-1 has been established, and the process proceeds to step S43.

In step S43, the display control section 53-2 causes the display section 31-2 to display a notification (for example, comment or the like) indicating that the connection to the portable terminal device 11-1 has been established on the basis of the information from the communication control section 54-2. Here, the display control section 53-2 may change the display of the display section 31-2 by making the display of a total or part (particularly, a region of the vicinity of the communication section 32-2) of the display section 31-2 bright or flickering the background like shimmering. Furthermore, the display control section 53-2 may light up an indicator (not shown) constituted by an LED or the like.

Thus, it is possible to transmit data from the portable terminal device 11-1 to the portable terminal device 11-2 by establishing the connection between the portable terminal device 11-1 and the portable terminal device 11-2. The connection strength in short-range communication between the portable terminal devices 11-1 and 11-2 is indicated by a change of the display of the display section 31, so that each user 12 can implement a more stable connection by adjusting a position of each portable terminal device 11.

In step S14, the display control section 53-1 causes the display section 31-1 to display an icon D corresponding to data to be transmitted on the basis of information corresponding to a data transmission instruction operation by the user 12-1 on the operation input section 33-1 from the operation detection section 51-1.

As described with reference to FIG. 1, in the portable terminal device 11-1, the display section 31-1 as a touch panel is pressed and operated by the finger of the user 12-1 or the stylus pen or the like handled by the user 12-1, so that the data icon D displayed on the display section 31-1 is freely moved on the display section 31-1.

From this state, in step S15, the operation detection section 51-1 of the portable terminal device 11-1 determines whether or not the icon D is moved (dragged) and is held in an outer edge portion of the display section 31-1 by the operation of the user 12-1. More specifically, the contact detection section 51a-1 detects a state in which the finger (or stylus pen) of the user 12-1 is in contact with the operation input section 33-1, and the coordinate recognition section 51b-1 determines whether or not the coordinate position at which the contact of the finger of the user 12-1 has been detected on the operation input section 33-1 by the contact detection section 51a-1 is in the outer edge portion of the display section 31-1. Here, the outer edge portion of the display section 31-1 represents a region in the vicinity of the communication section 32-1 on the display section 31-1 shown in FIG. 1. Here, it is determined whether or not the coordinate position of the finger of the user 12-1 is in the outer edge portion of the display section 31-1. Alternatively, for example, it may be determined whether or not the distance between the coordinate position of the center (centroid) of the icon D and the coordinate position of an end portion of the communication section 32-1 on the display section 31-1 is less than a predetermined value.

Figure 4:
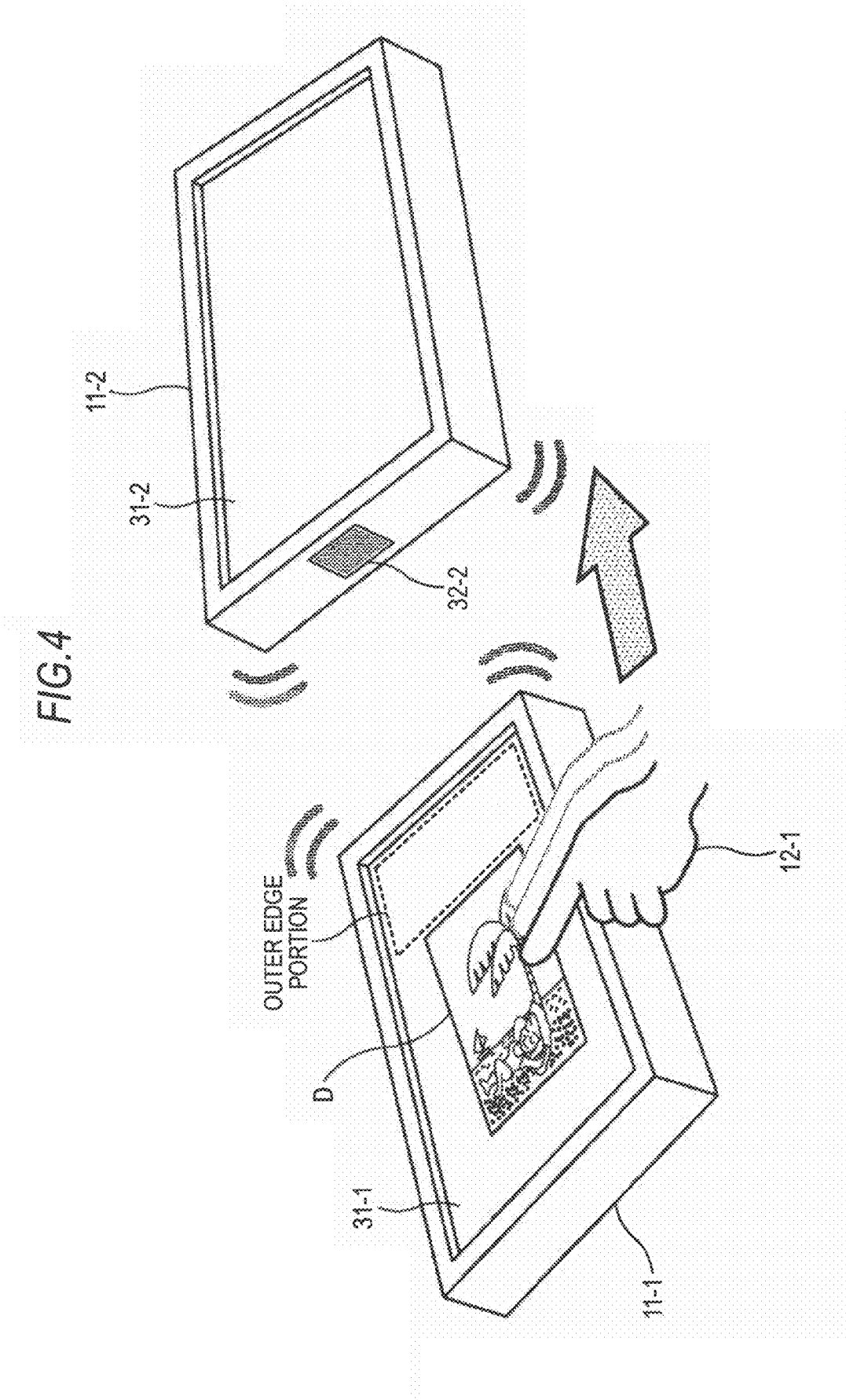
FIG. 4 is a diagram illustrating the icon display in the portable terminal device of the transmission/reception system.

That is, in step S15, it is determined whether or not the icon D is dragged in an arrow direction on the display section 31-1 (the right of the display section 31-1 (toward the portable terminal device 11-2)) by the finger of the user 12-1 as shown in FIG. 4 from a state in which a communication connection between the portable terminal device 11-1 and the portable terminal device 11-2 is established, and is held in an outer edge portion (in a range indicated by the dotted line in the figure) (the finger of the user 12-1 is in contact therewith). For example, as shown in FIG. 4, the user 12-1 can recognize a position of the outer edge portion by displaying the outer edge portion, for example, when the communication connection between the portable terminal device 11-1 and the portable terminal device 11-2 has been established.

When it is determined that the icon D is not held in the outer edge portion of the display section 31-1 in step S15, the process of step S15 is repeated until the icon D is held in the outer edge portion of the display section 31-1.

On the other hand, when it is determined that the icon D is held in the outer edge portion of the display section 31-1 in step S15, the transmission control section 54a-1 of the portable terminal device 11-1 causes the transmission section 32a-1 to transmit information (hereinafter, source holding information) indicating that the icon D is held in the outer edge portion of the display section 31-1 to the portable terminal device 11-2. In the flowchart of FIG. 3, the source holding information is indicated by the dotted-line arrow. Hereinafter, all information elements transmitted/received between the portable terminal devices 11-1 and 11-2 are indicated by the dotted-line arrow.

In step S44 after step S43, the communication party operation sensing section 55-2 of the portable terminal device 11-2 determines whether or not the icon D is held in the outer edge portion of the source (the portable terminal device 11-1) on the basis of source holding information transmitted from the portable terminal device 11-1 via the reception section 32b-2 and the reception control section 54b-2.

When the source holding information is not transmitted from the portable terminal device 11-1 and it is determined that the icon D is not held in the outer edge portion of the source in step S44, the process of step S44 is repeated until the icon D is held in the outer edge portion of the source (portable terminal device 11-1).

On the other hand, in step S44, when it is determined that the source holding information transmitted from the portable terminal device 11-1 is received and the icon D is held in the outer edge portion of the source, the communication party operation sensing section 55-2 supplies the source holding information to the display control section 53-2 via the operation determination section 56-2, and the process proceeds to step S45.

In step S45, the display control section 53-2 of the portable terminal device 11-2 causes part of the icon D to be displayed in the outer edge portion of the display section 31-2 on the basis of the source holding information from the operation determination section 56-2.

Figure 5:
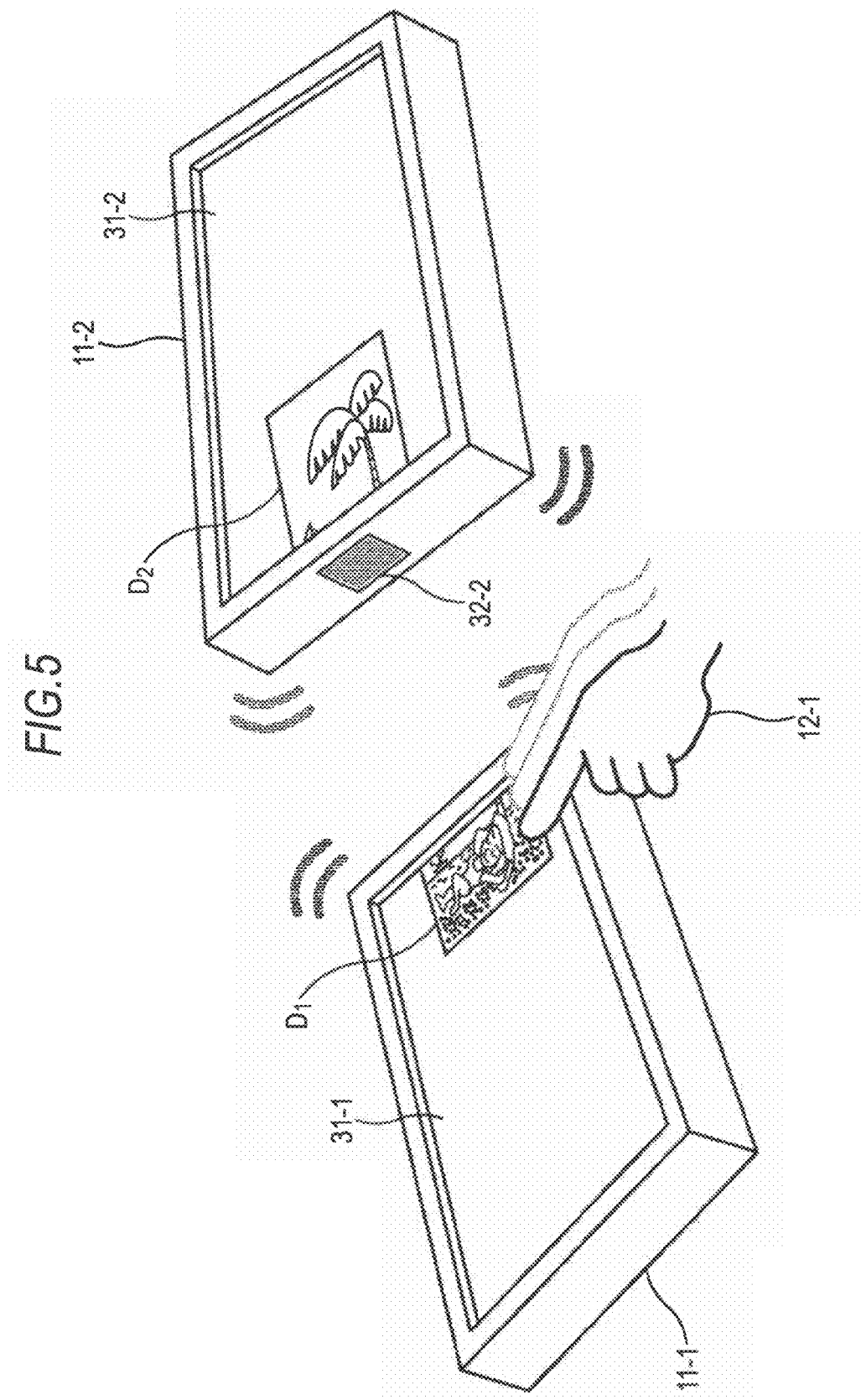
FIG. 5 is a diagram illustrating the icon display in the portable terminal device of the transmission/reception system.

More specifically, as shown in FIG. 5, when the icon D is held in the outer edge portion of the display section 31-1 of the portable terminal device 11-1, the source holding information is transmitted from the portable terminal device 11-1 to the portable terminal device 11-2. At this time, image data of a non-displayed part (a part out of the display section 31-1) of the icon D in the display section 31-1 of the portable terminal device 11-1 is transmitted along with the source holding information. When the portable terminal device 11-2 receives the source holding information, the non-displayed part of the icon D in the display section 31-1 is displayed in an outer edge portion of the display section 31-2 (the left of the display section 31-2 (toward the portable terminal device 11-1)) on the basis of the image data transmitted along with the source holding information. Here, as shown in FIG. 5, hereinafter, the part of the icon D displayed on the display section 31-1 is referred to as the icon $D_1$ and the part of the icon D displayed on the display section 31-2 is referred to as the icon $D_2$.

Furthermore, the portable terminal device 11-1 transmits the coordinate position of a predetermined point of the icon D (the icon $D_1$), for example, vertices of the icon $D_1$ (four points of a rectangle) on the display section 31-1, to the portable terminal device 11-2 along with the source holding information in addition to the image data of the icon D. Thus, the source holding information is transmitted from the portable terminal device 11-1 to the portable terminal device 11-2 at a predetermined interval, so that the portable terminal device 11-2 can calculate the coordinate position of the icon $D_2$ displayed on the display section 31-2 on the basis of the coordinate position of the icon $D_1$ and can move the icon $D_2$ in conjunction with the icon $D_1$.

In the above description, the image data of the non-displayed part of the icon D in the portable terminal device 11-1 is transmitted to the portable terminal device 11-2. Alternatively, image data of the entire icon D may be transmitted and the portable terminal device 11-2 may display the non-displayed part of the icon D, that is, the icon $D_2$, on the basis of the coordinate position of the icon $D_1$ displayed on the portable terminal device 11-1.

Returning to the flowchart of FIG. 3, in step S46 after step S45, the communication party operation sensing section 55-2 of the portable terminal device 11-2 determines whether or not the icon $D_1$ has been opened in the outer edge portion of the display section 31-1 of the portable terminal device 11-1. Here, when the finger of the user 12-1 is separated from the icon $D_1$ dragged and held on the display section 31-1 by the finger of the user 12-1, it may be said that the icon $D_1$ is opened. Also in the following, the same is true.

Also after it is determined that the icon D (the icon $D_1$) is held in the outer edge portion of the display section 31-1 of the portable terminal device 11-1 in step S15, the transmission control section 54a-1 causes the transmission section 32a-1 to transmit the source holding information to the portable terminal device 11-2 at a predetermined interval while the above-described state is continued (while the icon $D_1$ is held). In contrast, when the icon $D_1$ has been opened in the outer edge portion of the display section 31-1 (step S17 to be described later), the transmission control section 54a-1 causes the transmission section 32a-1 to transmit information (hereinafter, referred to as source opening information) indicating that the icon $D_1$ has been opened in the outer edge portion of the display section 31-1 to the portable terminal device 11-2.

That is, when the communication party operation sensing section 55-2 of the portable terminal device 11-2 has acquired the source opening information transmitted from the portable terminal device 11-1 via the reception section 32b-2 and the reception control section 54b-2, it is determined that the icon $D_1$ has been opened in the outer edge portion of the display section 31-1 in step S46 and the process proceeds to step S47. At this time, the communication party operation sensing section 55-2 supplies the source opening information to the display control section 53-2 via the operation determination section 56-2.

In step S47, the display control section 53-2 ends the display of the icon $D_2$ on the display section 31-2 on the basis of the source opening information from the operation determination section 56-2. The process returns to step S44. At this time, the entire icon $D_1$ is displayed on the display section 31-1 of the portable terminal device 11-1 (step S18 to be described later).

Figure 6:
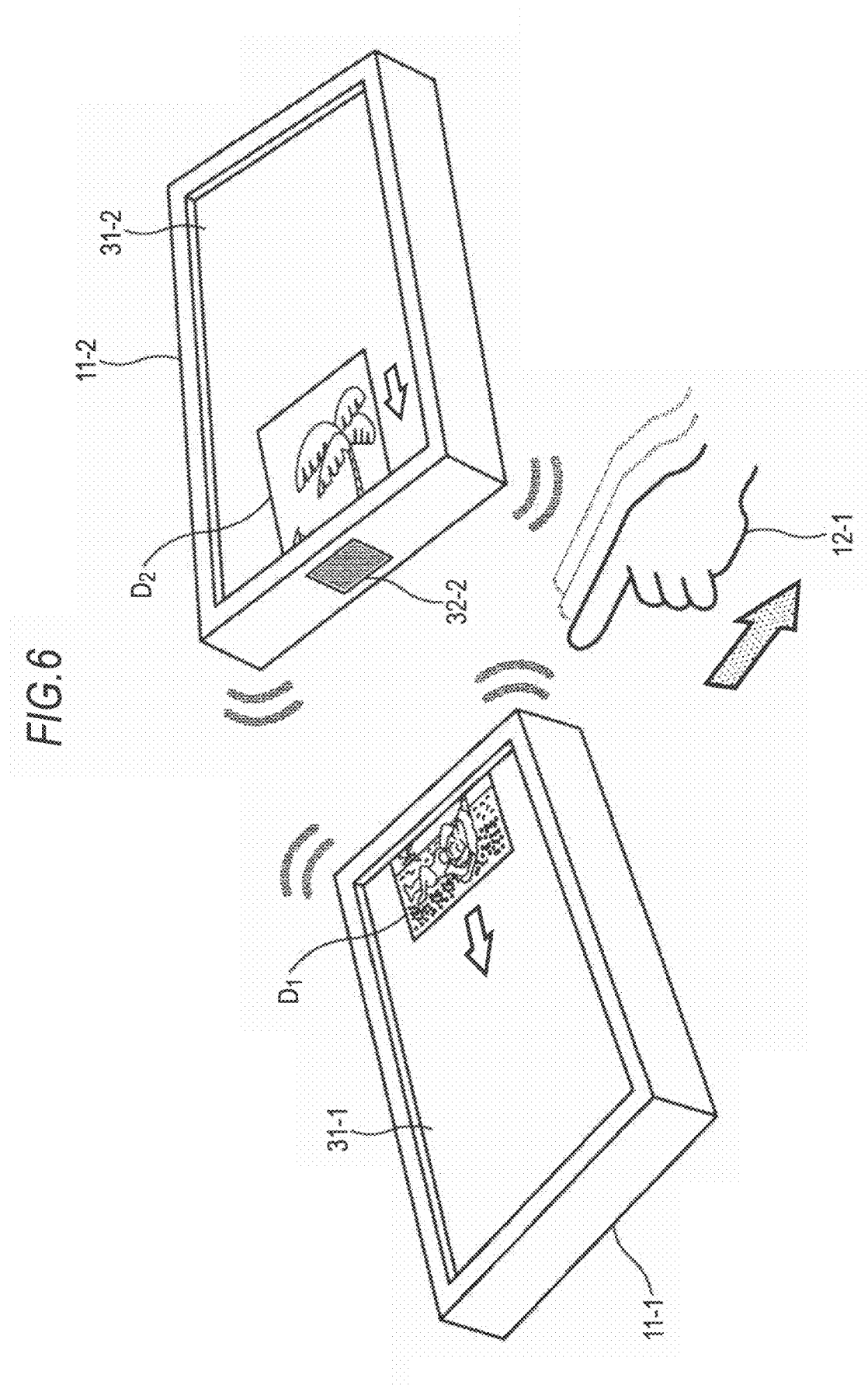
FIG. 6 is a diagram illustrating the icon display in the portable terminal device of the transmission/reception system.

That is, when the finger of the user 12-1 holding the icon $D_1$ on the display section 31-1 is opened from the display section 31-1 as shown in FIG. 6 from the state shown in FIG. 5, the display is ended so that the icon $D_2$ of the portable terminal device 11-2 returns to the portable terminal device 11-1. On the other hand, the icon $D_1$ of the portable terminal device 11-1 is displayed along with a part (the icon $D_2$) returning from the portable terminal device 11-2 and the entire icon (the icon D) is displayed.

On the other hand, when it is determined that the icon $D_1$ is not opened in the outer edge portion of the display section 31-1 in step S46, that is, when the source holding information is transmitted from the portable terminal device 11-1 to the portable terminal device 11-2 at a predetermined interval, the process proceeds to step S48.

In step S48, the operation detection section 51-2 of the portable terminal device 11-2 determines whether or not the icon $D_2$ is held by the display section 31-2. More specifically, the operation detection section 51-2 determines whether or not the contact detection section 51a-2 has detected the finger of the user 12-2 in contact with the operation input section 33-2.

That is, in step S48, it is determined whether or not the icon $D_2$ is held by the finger of the user 12-2 from the state shown in FIG. 5.

When it is determined that the icon $D_2$ is not held by the display section 31-2 in step S48, the process returns to step S46 and a subsequent process is repeated.

On the other hand, when it is determined that the icon $D_2$ is held by the display section 31-2 in step S48, the transmission control section 54a-2 of the portable terminal device 11-2 causes the transmission section 32a-2 to transmit information (hereinafter, destination holding information) indicating that the icon $D_2$ is held by the display section 31-2 to the portable terminal device 11-1.

In step S16 after step S15, the communication party operation sensing section 55-1 of the portable terminal device 11-1 determines whether or not the icon $D_2$ is held in the destination (the portable terminal device 11-2) on the basis of the destination holding information transmitted from the portable terminal device 11-2 via the reception section 32b-1 and the reception control section 54b-1.

When the destination holding information is not transmitted from the portable terminal device 11-2 and then it is determined that the icon $D_2$ is not held by the destination in step S16, the process proceeds to step S17.

In step S17, the operation detection section 51-1 of the portable terminal device 11-1 determines whether or not the icon $D_1$ has been opened in the outer edge portion of the display section 31-1. More specifically, the operation detection section 51-1 determines whether or not the contact detection section 51a-1 has detected that the finger of the user 12-1 has been opened from the operation input section 33-1 from the state shown in FIG. 5.

When it is determined that the icon $D_1$ is not opened in the outer edge portion of the display section 31-1 in step S17, the process returns to step S16 and a subsequent process is repeated.

On the other hand, when it is determined that the icon $D_1$ has been opened in the outer edge portion of the display section 31-1 in step S17, the process proceeds to step S18. At this time, the operation detection section 51-1 supplies the display control section 53-1 with information indicating that the icon $D_1$ has been opened in the outer edge portion of the display section 31-1 via the operation determination section 56-1 (or directly).

In step S18, the display control section 53-1 causes the display section 31-1 to display the entire icon D from the displayed icon $D_1$ on the basis of the information from the operation determination section 56-1. At this time, the icon $D_2$ in the display section 31-2 of the portable terminal device 11-2 returns to the portable terminal device 11-1 and the display is ended (the above-described step S47). The process returns to step S15 after step S18 and a subsequent process is repeated.

When the destination holding information transmitted from the portable terminal device 11-2 is received and it is determined that the icon $D_2$ is held in the destination (the portable terminal device 11-2) in step S16, the process proceeds to step S19.

Also after it is determined that the icon $D_2$ is held in the outer edge portion of the display section 31-2 of the portable terminal device 11-2 (after step S48), the transmission control section 54a-2 causes the transmission section 32a-2 to transmit the destination holding information to the portable terminal device 11-1 at a predetermined interval while the above-described state is continued (while the icon $D_2$ is held). While the icon $D_1$ is held in the outer edge portion of the display section 31-1 of the portable terminal device 11-1 after step S16, the transmission control section 54a-1 causes the transmission section 32a-1 to transmit the source holding information to the portable terminal device 11-2 at a predetermined interval.

Figure 7:
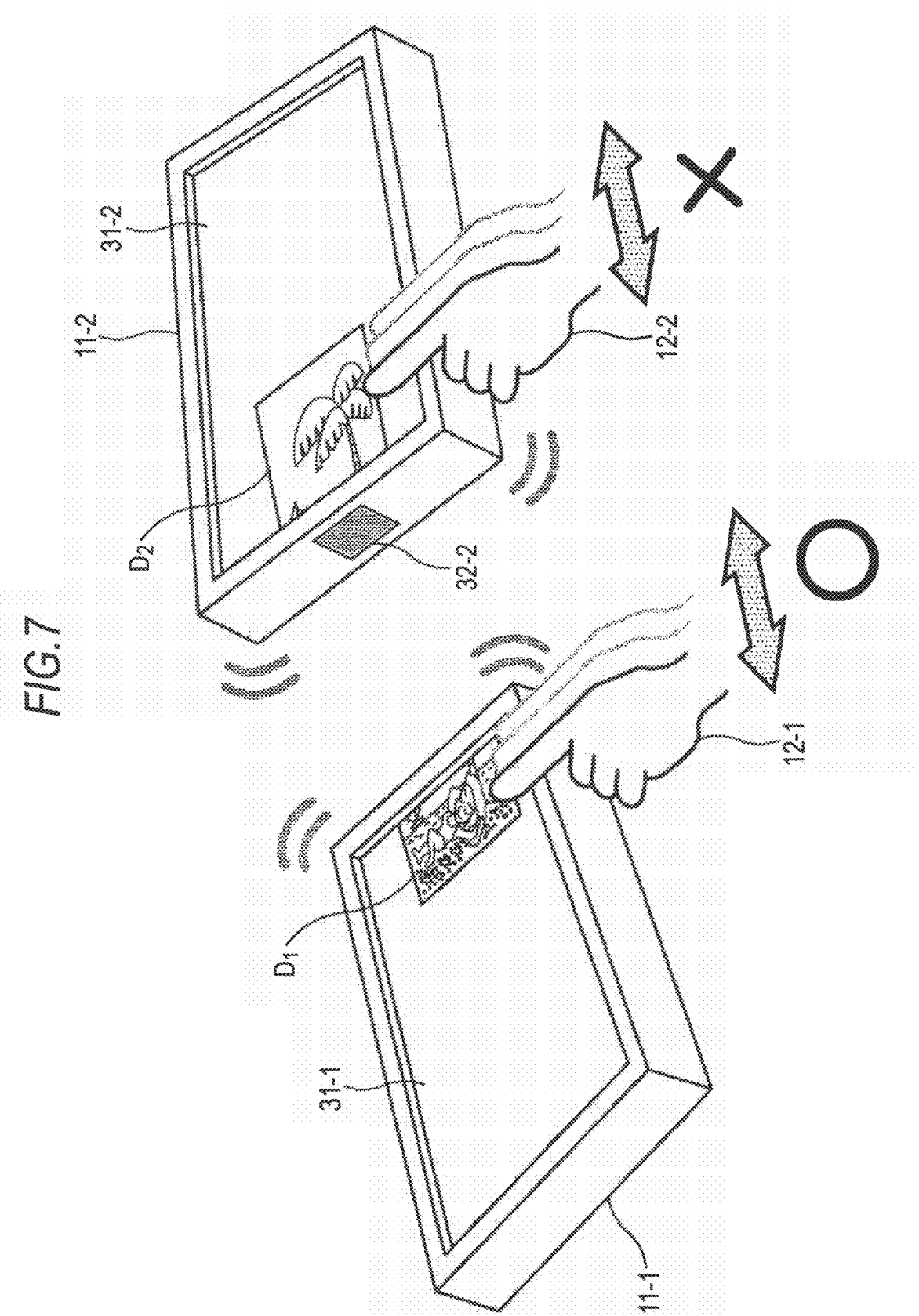
FIG. 7 is a diagram illustrating the icon display in the portable terminal device of the transmission/reception system.

That is, at this time, the icon $D_1$ is held in the outer edge portion of the display section 31-1 by the user 12-1 in the portable terminal device 11-1, and the icon $D_2$ is held in the outer edge portion of the display section 31-2 by the user 12-2 in the portable terminal device 11-2. In this state, as shown in FIG. 7, the user 12-2 may not freely move the icon $D_2$ on the display section 31-2 from the outer edge portion of the display section 31-2. On the other hand, even when the user 12-2 holds the icon $D_2$ in the outer edge portion of the display section 31-2, the user 12-1 can display the entire icon D (at this time, the display of the icon $D_2$ of the display section 31-2 is ended (disappears)) by freely moving the icon $D_1$ on the display section 31-1 from the outer edge portion of the display section 31-1. Therefore, the transmission/reception of data between the portable terminal device 11-1 and the portable terminal device 11-2 can be stopped according to an operation of the user 12-1.

Returning to the flowchart of FIG. 3, in step S19, the operation detection section 51-1 of the portable terminal device 11-1 determines whether or not the icon $D_1$ has been opened in the outer edge portion of the display section 31-1. More specifically, the operation detection section 51-1 determines whether or not the contact detection section 51a-1 has detected that the finger of the user 12-1 has been opened from the operation input section 33-1 from the state shown in FIG. 7.

When it is determined that the icon $D_1$ is not opened in the outer edge portion of the display section 31-1 in step S19, the process returns to step S16 and a subsequent process is repeated.

On the other hand, when it is determined that the icon $D_1$ has been opened in the outer edge portion of the display section 31-1 in step S19, the transmission control section 54a-1 causes the transmission section 32a-1 to transmit the source opening information to the portable terminal device 11-2.

In step S49 after step S48, the communication party operation sensing section 55-2 of the portable terminal device 11-2 determines whether or not the icon $D_1$ has been opened in the outer edge portion of the display section 31-1 of the portable terminal device 11-1.

When it is determined that the icon $D_1$ is not opened in the outer edge portion of the display section 31-1 in step S49, that is, when the source holding information is transmitted from the portable terminal device 11-1 to the portable terminal device 11-2 at a predetermined interval, the process returns to step S48 and a subsequent process is repeated.

On the other hand, when the communication party operation sensing section 55-2 of the portable terminal device 11-2 has acquired the source opening information transmitted from the portable terminal device 11-1 via the reception section 32b-2 and the reception control section 54b-2, it is determined that the icon $D_1$ has been opened in the outer edge portion of the display section 31-1 in step S49 and the process proceeds to step S50.

Figure 8:
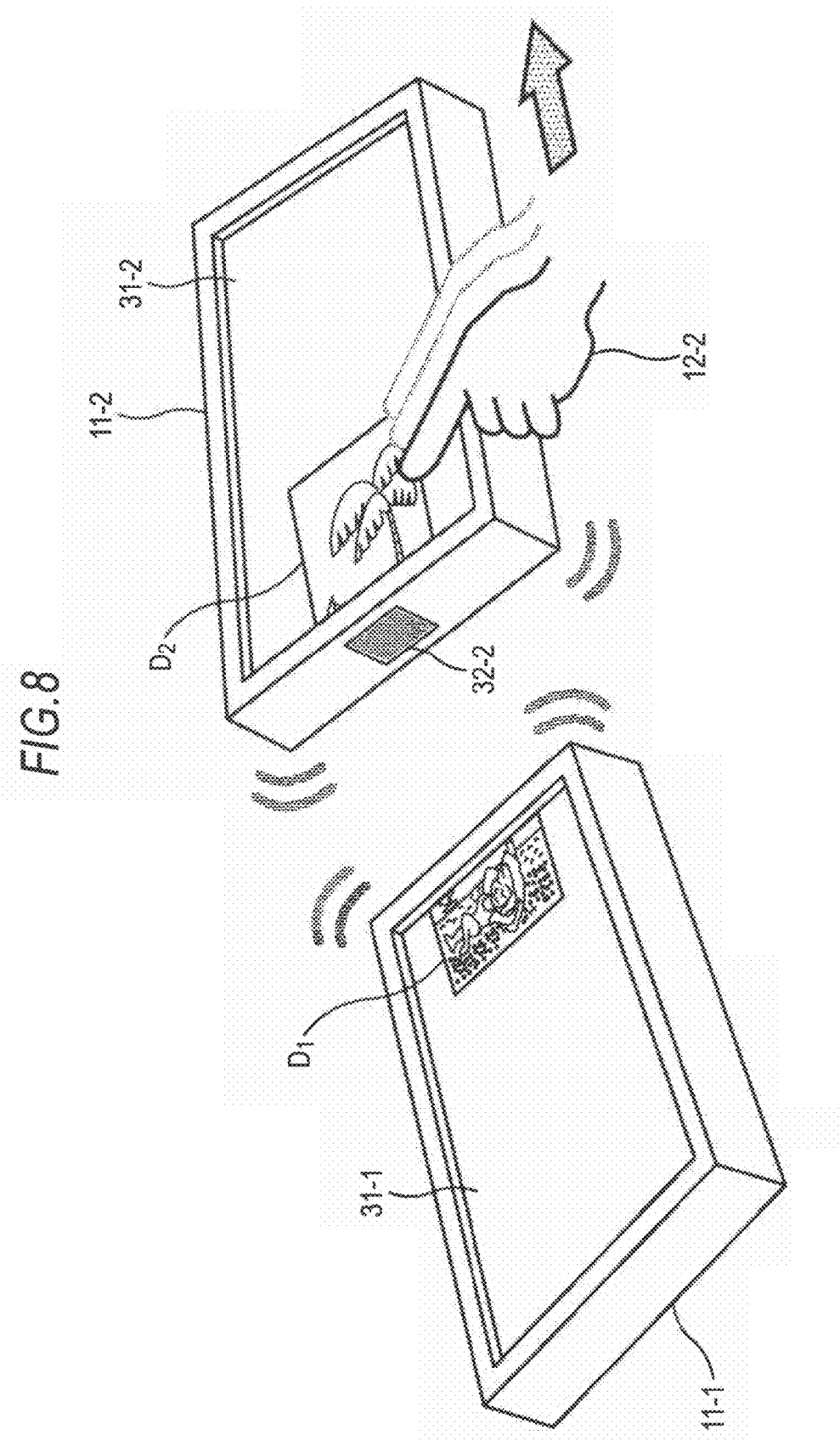
FIG. 8 is a diagram illustrating the icon display in the portable terminal device of the transmission/reception system.

That is, at this time, the finger of the user 12-1 holding the icon $D_1$ in the display section 31-1 of the portable terminal device 11-1 is opened from the display section 31-1 from the state shown in FIG. 7. As shown in FIG. 8, it becomes only a state in which the icon $D_2$ in the display section 31-2 of the portable terminal device 11-2 is held by the finger of the user 12-2. In this state, the user 12-2 can freely move the icon $D_2$ on the display section 31-2 from the outer edge portion of the display section 31-2. At this time, the portable terminal device 11-1 moves the icon $D_1$ on the display section 31-1 in conjunction with the icon $D_2$ on the basis of the coordinate position of a predetermined point of the icon $D_2$ transmitted from the portable terminal device 11-2 in response to the movement of the icon $D_2$ on the display section 31-2.

In step S50, the user 12-2 moves (drags) the icon $D_2$ from the outer edge portion of the display section 31-2 to the vicinity of the center portion of the display section 31-2, so that the operation detection section 51-2 of the portable terminal device 11-2 determines whether or not the entire icon $D_2$ (the icon D) has been displayed in the display section 31-2. More specifically, the contact detection section 51a-2 detects that the finger of the user 12-2 is in contact with the operation input section 33-2, and the coordinate recognition section 51b-2 determines whether or not the coordinate position at which the contact of the finger of the user 12-2 has been detected on the operation input section 33-2 by the contact detection section 51a-2 is in the vicinity of the center portion of the display section 31-2. Here, it is determined whether or not the coordinate position of the finger of the user 12-2 is in the vicinity of the center portion of the display section 31-2. For example, it may be determined whether or not the distance between the coordinate position of the center (centroid) of the icon $D_2$ (the icon D) and the coordinate position of the center of the display section 31-2 is less than a predetermined value.

When it is determined that the entire icon D is not displayed on the display section 31-2 instep S50, the process of step S50 is repeated until the entire icon D is displayed.

Figure 9:
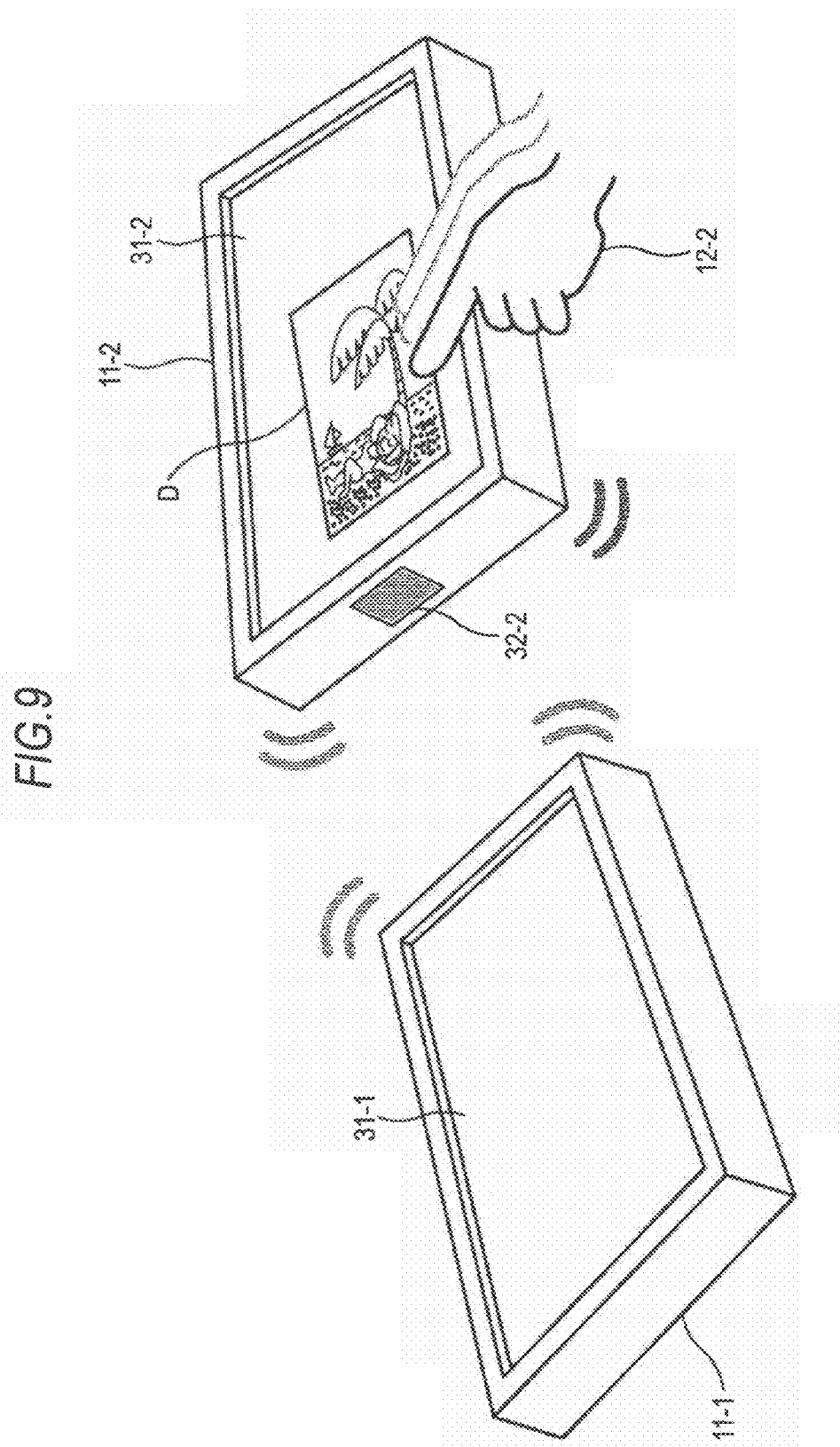
FIG. 9 is a diagram illustrating the icon display in the portable terminal device of the transmission/reception system.

On the other hand, when the icon $D_2$ is moved (dragged) from the outer edge portion of the display section 31-2 by the user 12-2 to the vicinity of the center portion of the display section 31-2 and it is determined that the entire icon D has been displayed on the display section 31-2 as shown in FIG. 9 in step S50, the transmission control section 54a-2 causes the transmission section 32a-2 to transmit information indicating that the entire icon D has been displayed on the portable terminal device 11-2 to the portable terminal device 11-1.

In step S20, the display control section 53-1 of the portable terminal device 11-1 causes the display section 31-1 to end the display of the icon $D_1$ on the basis of information transmitted from the portable terminal device 11-2 via the reception section 32b-2 and the reception control section 54b-2. The process proceeds to step S21.

In step S21, the transmission control section 54a-1 acquires data corresponding to the icon D read by the recording control section 52-1 from the recording section 34-1 in response to an instruction from the operation determination section 56-1, and causes the transmission section 32a-1 to start data transmission to the portable terminal device 11-2. More specifically, when the operation determination section 56-1 determines that the icon $D_1$ is opened by the user 12-1, the icon $D_2$ is dragged by the user 12-2, and the entire icon D is displayed on the display section 31-2 on the basis of the information from the operation detection section 51-1 and the information from the communication party operation sensing section 55-1 from a state in which the icon $D_1$ displayed on the portable terminal device 11-1 is held by the user 12-1 and the icon $D_2$ displayed on the portable terminal device 11-2 is held by the user 12-2, information for instructing the recording control section 52-1 to read data corresponding to the icon D from the recording section 34-1 is supplied thereby. The recording control section 52-1 reads the data corresponding to the icon D on the basis of the information from the operation determination section 56-1 and supplies the read data to the transmission control section 54a-1. The transmission control section 54a-1 causes the transmission section 32a-1 to transmit the data corresponding to the icon D based on the information from the operation determination section 56-1 to the portable terminal device 11-2.

In step S22, the transmission control section 54a-1 determines whether or not the data transmission has been completed. When all data corresponding to the icon D recorded to the recording section 34-1 are not transmitted, it is determined that the data transmission is not completed and the process of step S22 is repeated until the data transmission is completed.

On the other hand, when it is determined that the data transmission has been completed in step S22, the transmission control section 54a-1 supplies the display control section 53-1 with information indicating that the data transmission has been completed and the process proceeds to step S23.

Instep S23, the display control section 53-1 causes the display section 31-1 to display a notification (for example, comment or the like) indicating that the data transmission has been completed on the basis of information from the communication control section 54-1.

On the other hand, a process corresponding to steps S21 to S23 is executed even in the portable terminal device 11-2.

That is, in step S51 after step S50, the reception control section 54b-2 causes the reception section 32b-2 to start data reception from the portable terminal device 11-1. At this time, when the operation determination section 56-2 determines that the icon $D_1$ is opened by the user 12-1, the icon $D_2$ is dragged by the user 12-2, and the entire icon D is displayed on the display section 31-2 on the basis of the information from the operation detection section 51-2 and the information from the communication party operation sensing section 55-2 from a state in which the icon $D_1$ displayed on the portable terminal device 11-1 is held by the user 12-1 and the icon $D_2$ displayed on the portable terminal device 11-2 is held by the user 12-2, information for instructing the recording control section 52-2 to record data corresponding to the icon D directed to the recording section 34-2 is supplied. The recording control section 52-2 records the data corresponding to the icon D from the portable terminal device 11-1, which is input to the reception section 32b-2 and is supplied from the reception control section 54b-2, to the recording section 34-2 on the basis of the information from the operation determination section 56-2.

In step S52, the reception control section 54b-2 determines whether or not the data reception has been completed. When all data from the portable terminal device 11-1 have not been received, it is determined that data reception is not completed and the process of step S52 is repeated until data reception is completed.

On the other hand, when it is determined that the data reception has been completed in step S52, the reception control section 54b-2 supplies the display control section 53-2 with information indicating that the data reception has been completed and the process proceeds to step S53.

In step S53, the display control section 53-2 causes the display section 31-1 to display a notification (for example, comment or the like) indicating that data transmission has been completed on the basis of the information from the communication control section 54-2.

When there is no other data to be transmitted/received after data transmission/reception has been completed and a connection between the portable terminal devices 11-1 and 11-2 is unnecessary, the users 12-1 and 12-2 may be prompted to perform a connection release operation. The connection may be automatically released by moving the portable terminal device 11-1 or the portable terminal device 11-2 to an area where short-range wireless communication may not be possible and a connection may not be possible.

According to the above process, when the icon $D_1$ is opened by the user 12-1, the icon $D_2$ is dragged by the user 12-2, and the entire icon D is displayed on the display section 31-2 from a state in which the icon $D_1$ displayed on the portable terminal device 11-1 is held by the user 12-1 and the icon $D_2$ displayed on the portable terminal device 11-2 is held by the user 12-2, data is transmitted from the portable terminal device 11-1 to the portable terminal device 11-2, so that the users can exchange data by a more simple and intuitive operation of holding and separating an icon close to an operation of actually handing over an object. Data can be exchanged by an operation with the agreement between the users since data transmission/reception is not started when the user 12-1 holds the icon $D_1$ even though the user 12-2 desires to display the entire icon D on the display section 31-2 by dragging the icon $D_2$.

When data to be transmitted is data incapable of being replicated in the above process, the data of the portable terminal device 11-1 may be deleted after data transmission to the portable terminal device 11-2 is completed. When data to be transmitted is data capable of being replicated, it is possible to record the data of the portable terminal device 11-1 without deleting the data.

When data capable of being replicated is transmitted to the other party by applying a touch panel capable of recognizing another point to the display section 31, it is possible to drag and copy an icon with another finger in a state in which the icon corresponding to the data is held by one finger. At this time, the user can easily view that a copy of data has been transmitted by creating a copy (replica) of data, further dragging an icon dragged (copied) with one finger to the outer edge portion of the display section 31, and transmitting the data copy to the other party.

In the above process, when the icon $D_2$ in the portable terminal device 11-2 has been held or opened by the user 12-2, a total or part thereof may vibrate in the portable terminal device 11-1. Thus, the users can exchange data by an operation closer to an operation of actually handing over an object. When the icon $D_2$ has been held or opened by the user 12-2, the display of the icon $D_1$ may be changed by changing the color of the icon or forming a border around the icon in the portable terminal device 11-1.

For example, when the icon D is held or opened by the finger of the user 12 or a stylus pen in the display section 31, the icon D may be displayed to be enlarged to a predetermined size by dragging the icon to the outer edge portion of the display section 31 in the case where a display size of the icon D itself is small.

Of course, when data is transmitted from the portable terminal device 11-2 to the portable terminal device 11-1, data can be transmitted as in the above-described process.

The series of processes described above may be executed by hardware or software. When the series of processes is executed by software, a program constituting the software is installed from a program recording medium in a computer embedded in dedicated hardware or a general-purpose personal computer capable of executing various functions by installing various programs.

As shown in FIG. 2, a program recording medium installed in a computer and storing a computer executable program includes a magnetic disc (including a flexible disc), an optical disc (including a CD-ROM (Compact Disc-Read Only Memory), and a DVD), a magneto-optical disc, the removable media 37 as package media including a semiconductor memory, a ROM (not shown) temporarily or permanently storing a program, or a hard disc constituting the recording section 34. An operation of storing a program on a program storage medium is performed using a wired or wireless communication medium such as a network, a short-range communication network, the internet, or digital satellite broadcasting via the communication section 32 which is an interface such as a router or a modem as necessary.

A program to be executed by the computer may be a program which chronologically executes a process according to the sequence described in the present specification, and may be a program which executes a process in parallel or at an appropriate timing such as when a call is made.

The present invention is not limited to the above-described embodiments, and various changes are possible within a range without departing from the scope of the present invention.

In the present specification, the system includes a plurality of devices or all devices constituted by a processing section.

The present application contains subject matter related to that disclosed in Japanese Priority Patent Application JP 2009-110294 filed in the Japan Patent Office on Apr. 30, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device for transmitting data to a reception device as a data destination, the transmission device having a first touch panel display section and the reception device having a second touch panel display section, the transmission device comprising:
   a display control means for controlling display of an icon corresponding to the data on the first touch panel display section;
   an operation detection means for detecting an operation of a first user on the first touch panel display section on which the icon is displayed;
   a destination operation sensing means for sensing an operation of a second user on the second touch panel display section, which displays part of the icon when the icon is held by the first user in a predetermined region of the first touch panel display section; and
   a transmission control means for controlling the start of transmission of the data to the reception device when the operation detection means detects a change to a state in which the icon is opened in the predetermined region of the first touch panel display section by the first user from a state in which the icon is held in the predetermined region of the first touch panel display section by the first user and the part of the icon is held in the second touch panel display section by the second user.

2. The transmission device according to claim 1,
   wherein when (a) the operation detection means detects a change to a state in which the icon is opened in an outer edge portion of the first touch panel display section by the first user from a state in which the icon is held in the outer edge portion of the first touch panel display section by the first user and the part of the icon is held in the second touch panel display section by the second user and (b) the destination operation sensing means senses that the entire icon is held to be displayed on the second touch panel display section by the second user,
   the display control means ends the icon display on the first touch panel display section, and
   the transmission control means controls the start of the transmission of the data to the reception device.

3. The transmission device according to claim 2,
   wherein the display control means causes the first touch panel display section to display the entire icon when the operation detection means senses a change to a state in which the icon is opened in the first touch panel display section by the first user from a state in which the icon is held in the outer edge portion of the first touch panel display section by the first user and the part of the icon is displayed on the second touch panel display section is not being held by the second user.

4. A transmission method for use in a transmission device for transmitting data to a reception device as a data destination, the transmission device having a first touch panel display section and the reception device having a second touch panel display section, the transmission method comprising:
   controlling display of an icon corresponding to the data on the first touch panel display section;
   detecting an operation of a first user on the first touch panel display section on which the icon is displayed;
   sensing an operation of a second user on the second touch panel display section, which displays part of the icon when the icon is held in a predetermined region of the first touch panel display section by the first user; and
   controlling the start of transmission of the data to the reception device when a change is detected to a state in which the icon is opened in the predetermined region of the first touch panel display section by the first user from a state in which the icon is held in the predetermined region of the first touch panel display section by the first user and the part of the icon is held in the second touch panel display section by the second user.

5. A reception device for receiving data transmitted from a transmission device as a data source, the transmission device having a first touch panel display section and the reception device having a second touch panel display section, the reception device comprising:
   a source operation sensing means for sensing an operation of a first user on the first touch panel display section on which an icon corresponding to the data is displayed in the transmission device;
   a display control means for controlling display of part of the icon a on the second touch panel display section when the source operation sensing means senses that the icon is held in a predetermined region of the first touch panel display section by the first user;
   an operation detection means for detecting an operation of a second user on the second touch panel display section on which the part of the icon is displayed; and a reception control means for controlling the start of reception of the data transmitted from the transmission device when the source operation sensing means senses a change to a state in which the icon is opened in a predetermined region of the first touch panel display section by the first user from a state in which the icon is held in the predetermined region of the first touch panel display section by the first user and the part of the icon is held in the second touch panel display section by the second user.

6. The reception device according to claim 5,
wherein the reception control means controls the start of the reception of the data transmitted from the transmission device when (a) the source operation sensing means senses a change to a state in which the icon is opened in an outer edge portion of the first touch panel display section by the first user from a state in which the icon is held in the outer edge portion of the first touch panel display section by the first user and the part of the icon is held in the second touch panel display section by the second user, and (b) the operation detection means detects that the entire icon is held to be displayed on the second touch panel display section by the second user.

7. The reception device according to claim 6,
wherein the display control means ends the icon display on the first touch panel display section when the source operation sensing means senses a change to a state in which the icon is opened in the outer edge portion of the first touch panel display section by the first user from the state in which the icon is held in the outer edge portion of the first touch panel display section by the first user and the part of the icon is displayed on the second touch panel display section.

8. A reception method for use in a reception device for receiving data transmitted from a transmission device as a data source, the transmission device having a first touch panel display section and the reception device having a second touch panel display section, the reception method comprising:
sensing an operation of a first user on the first touch panel display section on which an icon corresponding to the data is displayed in the transmission device;
controlling display of part of the icon on the second touch panel display section when it is sensed that the icon is held in a predetermined region of the first touch panel display section by the first user;
detecting an operation of a second user on the second touch panel display section on which the part of the icon is displayed; and
controlling the start of reception of the data transmitted from the transmission device when a change is detected to a state in which the icon is opened in a predetermined region of the first touch panel display section by the first user from a state in which the icon is held in the predetermined region of the first touch panel display section by the first user and the part of the icon is held in the second touch panel display section by the second user.

9. A transmission/reception system having a transmission device configured to transmit data and a reception device configured to receive the data transmitted from the transmission device, the transmission device having a first touch panel display section and the reception device having a second touch panel display section, the system comprising:
the transmission device having
a first display control means for controlling display of an icon corresponding to the data on the first touch panel display section;
a first operation detection means for detecting an operation of a first user on the first touch panel display section on which the icon is displayed;
a destination operation sensing means for sensing an operation of a second user on the second touch panel display section, which displays part of the icon when the icon is held in a predetermined region of the first touch panel display section by the first user; and
a transmission control means for controlling the start of transmission of the data to the reception device when the first operation detection means detects a change to a state in which the icon is opened in the predetermined region of the first touch panel display section from a state in which the icon is held in the predetermined region of the first touch panel display section by the first user and the part of the icon is held in the second touch panel display section by the second user; and
the reception device having
a source operation sensing means for sensing the operation of the first user on the first touch panel display section in the transmission device;
a second display control means for controlling display of the part of the icon on the second touch panel display when the source operation sensing means senses that the icon is held in a predetermined region of the first touch panel display section by the first user;
a second operation detection means for detecting an operation of a second user on the second touch panel display section on which the part of the icon is displayed; and
reception control means for controlling the start of reception of the data transmitted from the transmission device when the source operation sensing means senses a change to a state in which the icon is opened in the predetermined region of the first touch panel display section by the first user from the state in which the icon is held in the predetermined region of the first touch panel display section by the first user and the part of the icon is held in the second touch panel display section by the second user.

10. A transmission device for transmitting data to a reception device as a data destination, the transmission device having a first touch panel display section and the reception device having a second touch panel display section, the transmission device comprising:
a display control unit configured to control display of an icon corresponding to the data on the first touch panel display section;
an operation detection unit configured to detect an operation of a first user on the first touch panel display section on which the icon is displayed;
a destination operation sensing unit configured to sense an operation of a second user on the second touch panel display section on which part of the icon is displayed in the reception device when the icon is held in a predetermined region of the first touch panel display section by the first user; and
a transmission control unit configured to control the start of transmission of the data to the reception device when the operation detection unit detects a change to a state in which the icon is opened in the predetermined region of the first touch panel display section from a state in which the icon is held in the predetermined region of the first touch panel display section by the first user and the part of the icon is held in the second touch panel display section by the second user.

11. A reception device for receiving data transmitted from a transmission device as a data source, the transmission device having a first touch panel display section and the reception device having a second touch panel display section, the reception device comprising:
- a source operation sensing unit for sensing an operation of a first user on the first touch panel display section on which an icon corresponding to the data is displayed;
- a display control unit for controlling display of part of the icon on the second touch panel display section when the source operation sensing unit senses that the icon is held in a predetermined region of the first touch panel display section by the first user;
- an operation detection unit for detecting an operation of a second user on the second touch panel display section on which the part of the icon is displayed; and
- a reception control unit for controlling the start of reception of the data transmitted from the transmission device when the source operation sensing unit senses a change to a state in which the icon is opened in a predetermined region of the first touch panel display section by the first user from a state in which the icon is held in the predetermined region of the first touch panel display section by the first user and the part of the icon is held in the second touch panel display section by the second user.

\* \* \* \* \*